United States Patent [19]
Bushman

[11] Patent Number: 5,929,732
[45] Date of Patent: Jul. 27, 1999

[54] APPARATUS AND METHOD FOR AMPLIFYING A MAGNETIC BEAM

[75] Inventor: Boyd B. Bushman, Lewisville, Tex.

[73] Assignee: Lockheed Martin Corporation, Fort Worth, Tex.

[21] Appl. No.: 08/842,850

[22] Filed: Apr. 17, 1997

[51] Int. Cl.[6] ........................................................ H01F 7/02
[52] U.S. Cl. .......................... 335/306; 315/5.35; 335/210
[58] Field of Search ........................... 335/210, 302–306; 310/90.5; 315/5.35; 324/318–320

[56] References Cited

U.S. PATENT DOCUMENTS

| | | | |
|---|---|---|---|
| 2,869,563 | 1/1959 | Schoengrun | 137/43 |
| 3,237,059 | 2/1966 | Meyerer | 335/306 |
| 3,349,354 | 10/1967 | Miyata | 335/209 |
| 3,781,592 | 12/1973 | Harrold | 335/210 |
| 4,568,901 | 2/1986 | Adam | 335/305 |
| 5,014,032 | 5/1991 | Aubert | 335/306 |
| 5,462,054 | 10/1995 | Rapoport et al. | 128/653.5 |
| 5,488,342 | 1/1996 | Hanley | 335/306 |
| 5,502,425 | 3/1996 | Tsai | 335/304 |

*Primary Examiner*—Michael L. Gellner
*Assistant Examiner*—Raymond Barrera
*Attorney, Agent, or Firm*—Baker & Botts, L.L.P.

[57] ABSTRACT

An apparatus and method for creating a magnetic beam wherein a focusing magnet assembly (45) is comprised of a first opposing magnet pair (20) and a second opposing magnet pair (30) disposed in a focusing plane, each magnet of the respective opposing magnet pairs having a like pole directed towards the geometric center of the focusing magnet assembly (45) to form an alignment path, two like magnetic beams extending from the alignment path on each side of the focusing magnet assembly (45), each beam being generally perpendicular to the focusing plane. A like pole of an unopposed magnet (10) can be directed down the alignment path from one side of the focusing magnet assembly (45) to produce a single magnetic beam extending generally perpendicular from the focusing magnet assembly opposite unopposed magnet (10). This beam is a magnetic monopole which emits pulses, levitates, degausses, stops electronics and separates materials.

18 Claims, 3 Drawing Sheets

APPARATUS AND METHOD FOR AMPLIFYING A MAGNETIC BEAM

TECHNICAL FIELD OF THE INVENTION

The present invention relates generally to the field of magnetic devices, and more particularly to focusing a magnetic field to increase the efficiency of a magnet.

BACKGROUND OF THE INVENTION

Magnets have a variety of commercial uses. For instance, magnets perform a variety of physical tasks by attracting ferric materials, and magnets also perform a variety of electrical tasks, such as creating an electric current in a generator or alternator or enhancing the performance of electromagnetic devices such as inductors. However, the creation of a strong magnetic field to perform these functions generally entails the use of a large permanent magnet or a powerful electromagnet. Such magnets are often physically large and heavy, and tend to produce wide magnetic fields which can interfere with equipment near the magnet. Thus, commercial devices that include magnets must be designed around the physical size of the magnet needed to produce a desired magnetic field and around the width of the magnetic field produced.

SUMMARY OF THE INVENTION

Therefore, a need has arisen for an apparatus and method for manipulating and focusing the magnetic field of a magnet to reduce the size and strength required for a given magnet to perform a function.

In accordance with the present invention, an apparatus and method is provided that substantially eliminates or reduces disadvantages and problems associated with previously used unfocused magnets. The present invention uses opposing magnetic pairs to direct a magnetic field along an alignment axis.

More specifically, the present invention focuses a magnetic beam along an alignment axis by providing a focusing magnet assembly having at least three opposing magnets spaced apart in a focusing plane, the space between the opposing magnets forming an alignment path, and by further providing an unopposed magnet generally directed along the alignment axis towards the alignment path. Each opposing magnet has a like pole facing across the alignment path. The alignment axis corresponds to the alignment path formed by the spacing between the focusing assembly of magnets. In one alternative embodiment, the unopposed magnet can be placed in the focusing plane to form opposing magnet pairs which direct a magnetic beam from the alignment path along the alignment axis from each side of the focusing assembly.

In one alternative embodiment, a coil of conducting material is disposed in the magnetic beam near the exit of the beam from the focusing magnet assembly. An unbalanced capacitor and a voltmeter connected in series with the coil allow the detection of movement through the magnetic beam by measuring variations in the AC voltage of the coil. Alternatively, AC voltage can be measured from a pin array disposed in the beam as a substitute for the coil and unbalanced capacitor. In yet another embodiment, electric power, such as an alternating current, can be passed through coils arranged around one or more of the magnets of the assembly to allow the generation of a magnetic pulse.

The focused magnetic beam or beams produced by the present invention provides important technical advantages by focusing a magnetic field. The focused field may perform functions using less total magnetic force than is generally used by an unfocused magnet. This allows for the use of smaller permanent magnets, or alternatively, electromagnets that use lower amounts of electric power. Thus, a commercial device built with magnets according to the present invention can be built smaller and with less of a need for power consumption than devices using standard magnets. For instance, the present invention can be used to more effectively separate ferric materials from non-ferric materials, and can more effectively induce propulsion or levitation in systems that use magnetic fields, such as electric motors or levitating trains that use opposing magnetic fields. The present invention can also interact with electromagnetic devices such as computers by stopping the operation of analog circuits from a distance, degaussing and otherwise interfering with digital circuits and memories, and emitting high powered electromagnetic pulses (EMP) at such circuits when induction coils are energized around the magnets with an alternating current. The present invention can also direct or transport electromagnetic charges through a distance.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to like and corresponding parts of the various drawings.

Figure 1:
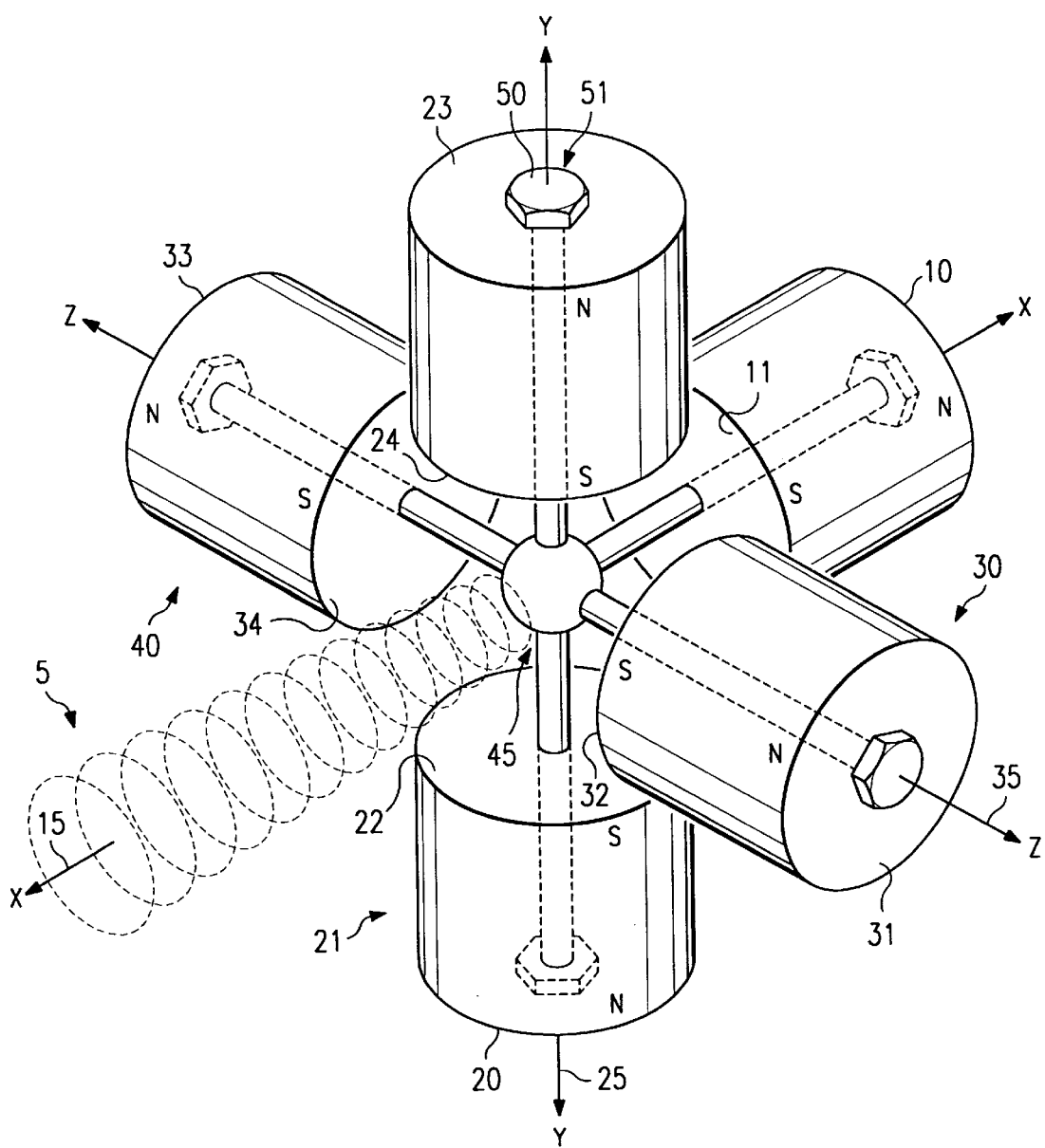
FIG. 1 depicts an assembly of five magnets to produce a magnetic beam.

Referring now to FIG. 1, one embodiment of the present invention is depicted creating a south magnetic beam 5. A single unopposed magnet 10 is aligned along an alignment axis 15 so that the south pole 11 of magnet 10 points substantially in the direction of the intended magnetic beam. The alignment axis 15 in FIG. 1 is labeled as the "X" axis. A first opposing magnet pair 20 is disposed along a first or "Y" axis 25 substantially perpendicular to the alignment axis 15. Opposing magnet pair 20 is comprised of two magnets, 21 and 23, substantially aligned along the "Y" axis 25 so that the south pole 22 of magnet 21 and the south pole 24 of magnet 23 face each other. Magnets 21 and 23 are arranged to have a space between them which coincides with the path of alignment axis 15.

A second opposing magnet pair 30 is disposed along a second or "Z" axis 35, which is substantially perpendicular to the alignment axis 15 and also substantially perpendicular to the "Y" axis 25, the first and second magnet pairs forming a focusing magnet assembly 40. Second opposing magnet pair 30 is comprised of two opposing magnets, 31 and 33, each substantially aligned along the "Z" axis 35 so that the south pole 32 of magnet 31 faces the south pole 34 of magnet 33. Magnets 31 and 33 are arranged with a space between them, the space coinciding with the path of the alignment axis 15. The spaces of first and second opposing magnet pairs 20 and 30 coincide to form an alignment path 45 through which the alignment axis 15 is disposed. The first axis 25 and second axis 35 intercept within alignment path 45 at the approximate geometric center of the magnet assembly to form a focusing plane.

In the embodiment depicted by FIG. 1, each magnet has approximately the same magnetic force, and each magnet is a niosyum magnet constructed in the form of a cylinder with a hole 50 down its center. Nonferric bolts 51 are inserted through each hole and intersect at the geographic center of the magnetic pairs, where the Nonferric bolts can be coupled to hold the magnets in place. In alternative embodiments, any other convenient means of coupling the magnets in place can be used, and alternative means of producing a magnetic force, such as electromagnets, can be used. In another embodiment, unopposed magnet 10 can be removed so that a magnetic beam extends along the alignment axis 15 from each side of the focusing plane.

The embodiment of FIG. 1 depicts a like pole of each magnet directed towards the geographic center of the focusing magnet assembly 40. In FIG. 1, the south pole of each magnet is depicted as directed at the alignment path 45 and at the geographic center of the focusing magnet assembly 40. In other embodiments, the north pole of each magnet can be directed at the geographic center. In either case, the coupling of like poles in a plane and the introduction of a like pole perpendicular to the plane acts to focus the magnetic fields of each magnet into a beam extending perpendicular from the focusing plane along the alignment axis 15 of the single unopposed magnet 10. Thus, an unopposed magnet that would ordinarily have a measurable magnetic field of four to six inches extending outward from a pole can have a beam extending five to seven feet outward from the pole. The focused magnetic beam 5 extends along the alignment axis 15 beyond the magnetic field that would occur if each magnetic field of the beam assembly were combined into a single magnetic field, such as would happen if each of the magnets were combined end-to-end. The direction and intensity of the beam can be altered by changing the alignment of the single opposing magnet 10, or by changing the position or strength of the magnets in the focusing magnet assembly relative to the focusing plane, or by changing the shape or configuration of individual magnets. Thus, for instance, the beam could be made to rotate around alignment axis 15 by sequentially altering the strength of each magnet in the focusing magnet assembly.

The increased magnetic field of the embodiment depicted in FIG. 1 can be demonstrated by its physical effects. For instance, an unopposed magnet 10 that can lift a ferric object at a distance of approximately one inch can lift the same ferric object through a distance of approximately six inches when coupled to a magnetic assembly comprised of two pairs of opposing magnets as is depicted in FIG. 1. The same assembly can cause cathode tube distortions at a distance of approximately two feet, can make electronic systems inoperable at a distance of approximately six inches, and can double the performance of an inductor at a distance of approximately eight inches.

In another example of the physical effects of an embodiment such as that depicted in FIG. 1, a VanDeGraaff generator with a spark potential of approximately three quarters of an inch from its bell can be placed between an assembly of north opposing magnets and an assembly of south opposing magnets, the north opposing magnets located eight inches from the bell, and the south opposing magnets located five feet from the bell, with the bell located one foot from its base. This configuration will produce a large spark from the VanDeGraaff to the south opposing magnets, indicating the potential for the present invention to perform electron transfer through a distance.

In alternative embodiments, various numbers of magnets or opposing magnet pairs can be arranged around the alignment axis 15 to focus the magnetic beam 5. For instance, three opposing magnets could be used instead of the four opposing magnets depicted in FIG. 1. Alternatively, a greater number of magnets or magnet pairs can be arranged offset to the focusing plane to alter the focus or strength of the magnetic beam 5. In yet another embodiment, a plurality of focusing magnet assemblies can be disposed along the alignment axis in a plurality of focusing planes.

Figure 2:
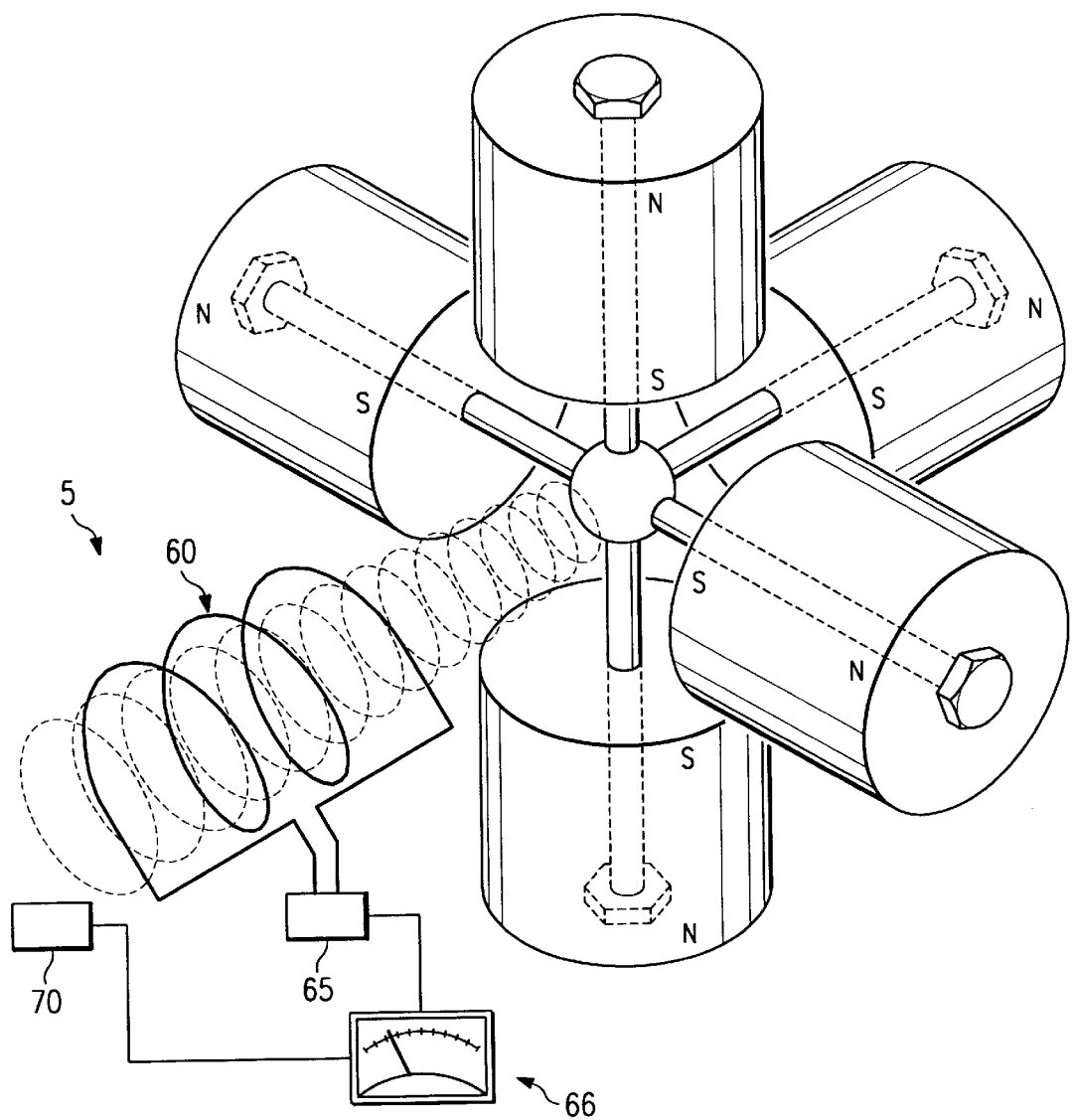
FIG. 2 depicts a magnetic beam adapted to detect motion.

Referring now to FIG. 2, two alternative embodiments of the present invention are depicted. First, a coil 60 comprised of a conducting material, such as copper, is disposed within a magnetic beam 5. An unbalanced capacitor 65 is coupled in series with the coil 60 and a voltmeter 66. Unbalanced capacitor 65 can be an electrical device such as the electrical device disclosed in U.S. patent application Ser. No. 08/144,814, by Boyd Bushman, abandoned, now issued as a continuation-in-part as U.S. Pat. No. 5,637,946, which is incorporated herein by reference. Voltmeter 66 is any conventional voltmeter capable of measuring an electric current, such as an alternating current. Movement, and even just the presence of objects, through the beam produces an AC voltage in coil 60 which can be detected by unbalanced capacitor 65 and measured by voltmeter 66.

Alternatively, a pin array 70 disposed in the magnetic beam 5 can also be used to measure disturbances, such as movement through the magnetic beam, which cause an AC voltage in pin array 70 that can be measured by voltmeter 66. Pin array 70 is any device such as the device disclosed in U.S. patent application Ser. No. 08/144,814, by Boyd Bushman, abandoned, now issued as a continuation-in-part as U.S. Pat. No. 5,637,946, which is incorporated herein by reference. Alternatively, any other means of measuring a disturbance through a magnetic field can be used.

Figure 3:
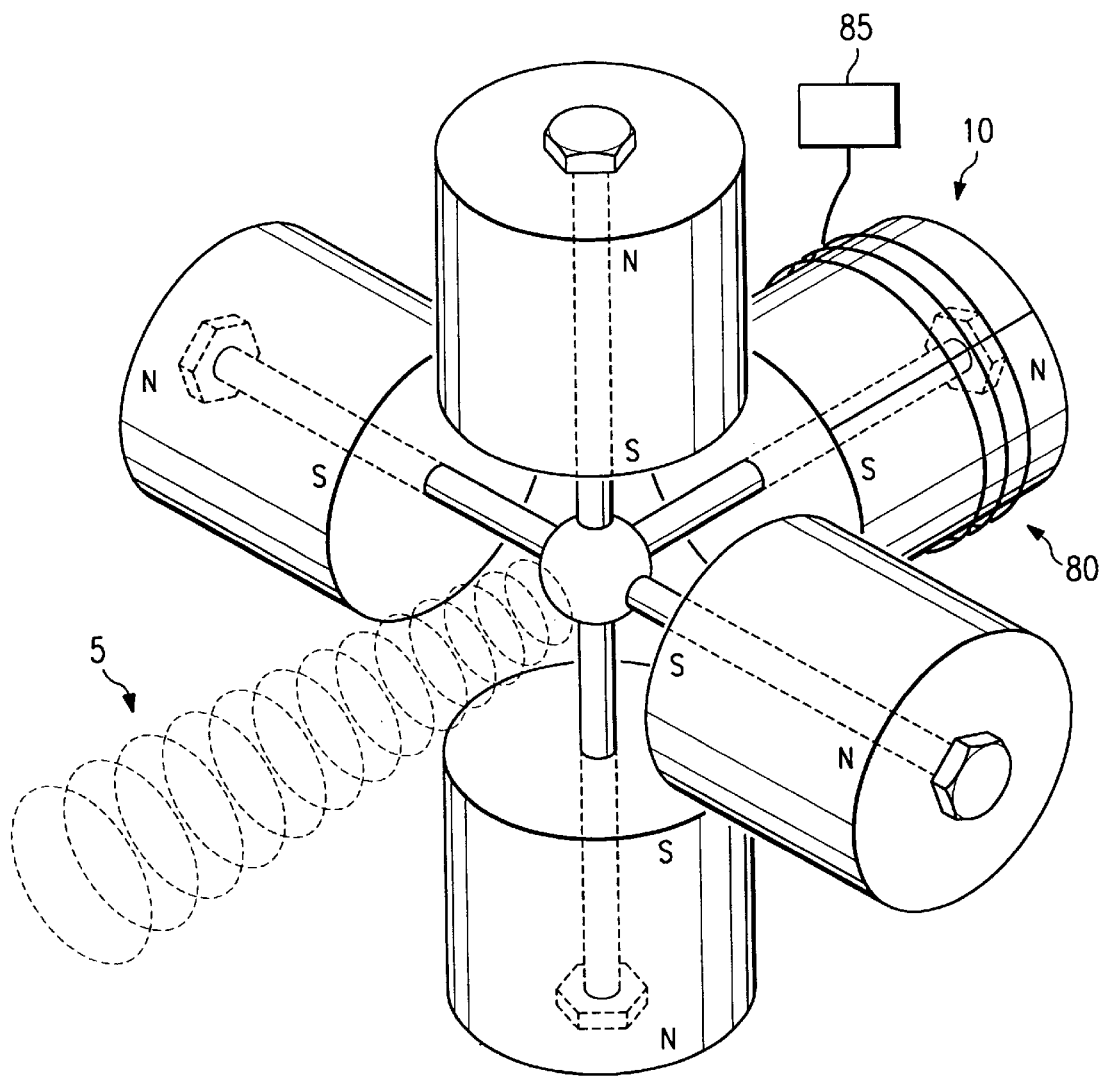
FIG. 3 depicts an electronic coil disposed around an opposing magnet for producing a magnetic pulse beam.

Referring now to FIG. 3, a coil 80 comprised of a conducting material, such as copper, is depicted disposed around single unopposed magnet 10. An electric power source, such as an AC generator 85 supplies an alternating current to coil 80 at a variety of frequencies. The strength of the magnetic beam 5 varies according to the frequency of the alternating current through coil 80 due to the magnetic field created by coil 80. Thus, a magnetic pulse beam is generated according to the frequency of the current passing through coil 80. When the frequency of the AC current is high, such as ten to the fifteenth power hertz, the magnetic pulse emitted simulates the effect of a destructive electromagnetic pulse. In alternative embodiments, coils can be disposed around each magnet or around the magnet assembly as a whole to create a magnetic field and pulse according to the frequency of a current applied to the coil.

The present invention provides several technical advantages related to the application of a magnetic field. For instance, by focusing a magnetic field, the present invention allows for a decrease in the size of magnets used in commercial devices. Thus, in commercial applications such as where a magnet is used to increase the efficiency of an inductor, the present invention allows for greater miniaturization with smaller magnets than would be allowed with the magnetic field of an unfocused magnet. Where the present invention is used with electromagnets, such as for the lifting of ferric materials, a smaller electric power source can be used to create a lifting magnetic force.

Although the present invention has been described in detail, it should be understood that various changes, substitutions and alterations can be made hereto without departing from the spirit and scope of the invention as defined by the appended claims.

What is claimed is:

1. An apparatus for creating a magnetic beam along an alignment axis, the apparatus comprising:

a focusing magnet assembly comprising at least three opposing magnets disposed in a focusing plane, the at least three opposing magnets forming an alignment path, the opposing magnets having like poles directed at the alignment path; and an unopposed magnet, the unopposed magnet having a like pole fixedly directed along the alignment axis towards the alignment path.

2. The apparatus according to claim 1 wherein the magnetic assembly has a geometric center and wherein the at least three opposing magnets and the unopposed magnet each have a south pole directed substantially at the geometric center of the magnetic assembly.

3. The apparatus according to claim 1 wherein the magnetic assembly has a geometric center and wherein the at least three opposing magnets and the unopposed magnet each have a north pole directed substantially at the geometric center of the magnetic assembly.

4. The apparatus according to claim 1 wherein the magnetic assembly comprises a plurality of opposing magnet pairs disposed in the focusing plane, each opposing magnet pair having two magnets, the magnets of the opposing magnet pairs forming the alignment path.

5. The apparatus according to claim 4 further comprising:

a coil of conducting material disposed along the alignment path; and an unbalanced capacitor coupled in series with the coil.

6. The apparatus according to claim 4 further comprising a pin array disposed within the magnetic beam.

7. The apparatus according to claim 4 further comprising:

a conducting coil disposed around at least one magnet; and an electric power source coupled to the conducting coil.

8. The apparatus according to claim 8 wherein the electric power source provides an AC current to the coil.

9. A magnetic assembly comprising:

a first opposing magnet pair comprising two magnets, each magnet having a like pole substantially aligned along a first axis, the like poles facing each other across a first space;

a second opposing magnet pair comprising two magnets, each magnet having a like pole substantially aligned along a second axis, the like poles facing each other across a second space, the second space coinciding proximate to the first space to form an alignment path; and, an unopposed magnet having a like pole fixedly directed at the alignment path.

10. The apparatus according to claim 9 wherein at least one of the magnets comprises an electromagnet.

11. A magnetic beam assembly according to claim 9 further comprising:

a conducting coil proximate to the alignment path; and an unbalanced capacitor coupled in series with the conducting coil.

12. A magnetic beam assembly according to claim 9 further comprising a pin array proximate to the alignment path.

13. The apparatus according to claim 9 wherein the first axis intersects the second axis to form a focusing plane, and wherein the unopposed magnet is substantially perpendicular to the focusing plane.

14. The apparatus according to claim 13 further comprising:

an electric coil disposed around the unopposed magnet; and an electric power source coupled to the coil.

15. A method for creating a magnetic beam, the method comprising the steps of:

disposing a first opposing magnet pair along a first axis, the first opposing magnet pair comprising two magnets having like poles facing each other across a first space;

disposing a second opposing magnet pair along a second axis, the second opposing magnet pair comprising two magnets having like poles facing each other across a second space, the second axis intersecting the first axis so that the first and second space form an alignment path; and fixedly directing a like pole of an unopposed magnet through the alignment path.

16. The method according to claim 15 further comprising the step of measuring fluctuations in the magnetic beam to determine the presence of objects proximate to the magnetic beam.

17. The method according to claim 15 further comprising the step of providing an electric current around at least one of the magnets to generate a magnetic pulse beam.

18. The method according to claim 15 further comprising the step of changing the strength of the magnetic field in at least one magnet of the opposing magnetic pairs to alter the direction of the magnetic beam.

* * * * *